United States Patent
Samson et al.

(10) Patent No.: US 6,646,601 B2
(45) Date of Patent: Nov. 11, 2003

(54) DIRECTION FINDING METHOD

(75) Inventors: See Chong Meng Samson, Singapore (SG); Gim Pew Quek, Singapore (SG)

(73) Assignee: DSO National Laboratories (SG)

( * ) Notice: Subject to any disclaimer, the term of this patent is extended or adjusted under 35 U.S.C. 154(b) by 0 days.

(21) Appl. No.: 09/963,166

(22) Filed: Sep. 25, 2001

(65) Prior Publication Data

US 2002/0190902 A1 Dec. 19, 2002

(30) Foreign Application Priority Data

Jun. 5, 2001 (SG) .......................................... 200103334

(51) Int. Cl.$^7$ ................................................. G01S 3/52
(52) U.S. Cl. ........................................ 342/418; 342/113
(58) Field of Search .............................. 342/113, 196, 342/418, 417, 442

(56) References Cited

U.S. PATENT DOCUMENTS

| | | | | |
|---|---|---|---|---|
| 5,299,148 A | * | 3/1994 | Gardner et al. | ............. 364/574 |
| 5,426,438 A | * | 6/1995 | Peavey et al. | ............. 342/433 |
| 5,497,161 A | * | 3/1996 | Tsui | ............................ 342/147 |
| 6,311,043 B1 | * | 10/2001 | Haardt et al. | .............. 455/67.1 |

* cited by examiner

Primary Examiner—Dao Phan
(74) Attorney, Agent, or Firm—Ipsolon LLP

(57) ABSTRACT

Determining the angle of arrival of a signal by providing a plurality of antennae, sampling, in turn, the output from each of the antennae to obtain a set of samples, each of the samples relating to different points in time, performing a Fourier transform on the set of samples, thereby producing a sequence of spectral lines, identifying a signal impinging on the antennae from the configuration of the spectral lines, and calculating, from phase and amplitude data gathered from at least a subset of the spectral lines, the direction of arrival of the signal at the antennae.

15 Claims, 4 Drawing Sheets

DIRECTION FINDING METHOD

THIS INVENTION relates to a method of determining the direction of arrival of signals impinging on a plurality of antennae.

BACKGROUND OF THE INVENTION

Direction finders are devices that determine the direction of arrival of signals impinging thereupon. Direction finders play an important role in spectrum monitoring, as well as in reconnaissance and surveillance applications, as the direction in which transmitters in the vicinity of a direction finder lie can be established. Typically, direction finders comprise an array of antennae which detect signals impinging thereon, with phase and amplitude information from the antennae being correlated to calculate the direction of arrival of the impinging signals.

In situations where strong multipath interference or co-channel signals exist, it is necessary to employ high resolution directions finding algorithms to interpret the data gathered by a direction finder. In conventional direction finders using such high resolution direction finding algorithms, one receiver is provided for each antenna. Since the signal output by each of the antennae must be coherently sampled, multi-channel receivers are required for this task. However, such receivers are relatively expensive and complicated in design.

If one receiver is provided for each antenna, the information received by each of the antennae may be continuously sampled. However, there are disadvantages to this mode of construction. It is costly to provide a large number of receivers, along with associated wiring and so forth, and in applications where the volume and/or weight of the direction finder are critical, the provision of a large number of receivers can be disadvantageous. In addition, the likelihood of equipment failure in the case of a direction finder having a large number of receivers is increased, and maintenance costs are inevitably higher. The Application of high resolution direction finding algorithms requires the receivers to be matched in their phase and amplitude response. To ensure that this situation exists, receiver calibration circuitry and signal sources are required. Hence, it will be appreciated that the need to maintain the calibration of the receivers will increase the cost and complexity of the direction finder.

In view of the above drawbacks, it has been proposed to construct a direction finder having fewer receivers than antennae. It will be appreciated that a consequence of this arrangement is that the information received by each of the antennae can no longer be continuously sampled simultaneously, and various techniques have been developed to compensate for this. For instance, it has been proposed to provide a time-varying pre-processing network between the antennae and the reduced number of receivers, and to implement an appropriate algorithm to interpret the data output from the time-varying pre-processing network. However, the proposed method requires at least two receivers, and shares the same receiver calibration and coherency requirements as conventional high resolution direction finding algorithms.

A further technique employs an array of antennae and a single receiver. The antennae in the array may be connected individually to an output by a switching network. In use of such an arrangement, the information output by a single antenna is received at the receiver at any one time, and knowledge of the geometric layout of the antennae comprising the array is employed to establish, from the data output by the receiver, the direction of arrival of signals impinging on the array. It will be understood that the above-mentioned drawback regarding calibration is overcome when a single receiver is used.

U.S. Pat. No. 5,497,161 describes a method of achieving high-resolution direction finding with a single receiver that sequentially samples the antennae in an antenna array. In use of this method, a vector of antenna array outputs that might have been gathered from each antenna simultaneously is reconstructed, by compensating for the time-delays arising from the sequential sampling using delay lines. Alternatively, the time-delays can be compensated for by means of digital signal processing to realign the received data samples. Once the vector of array outputs has been reconstructed, conventional high-resolution direction finding algorithms can be employed to determine the directions of arrival of signals impinging on the antenna array.

The drawback of this approach (when either delay lines or digital processing are employed) is that the antenna analogue to digital conversion sampling rate must be larger than 2N times the receiver bandwidth, where N is the number of antennae. This will result in implementation difficulties in modern spectral monitoring and surveillance applications, where the instantaneous bandwidth of the receiver is typically large. For example, a typical 5 element antenna array direction finder with a 10 MHz instantaneous bandwidth will require a sampling rate greater than 100 MHz (5×10×2 MHz). Hence, when employing this method in wide instantaneous receiver bandwidth applications, very high-speed radio frequency switches and analogue digital conversion will be required, even though the bandwidth of the received signal may be much smaller than the receiver bandwidth. However, the need for higher speed devices and the corresponding increase in the complexity of the circuitry will increase the cost of the system This increased cost offsets the savings offered by the reduction in the number of receivers.

When delay lines are used to introduce time delays to realign the data received from the antenna array, the lengths of the delay line need to be highly accurate, as errors in the realignment of the data will introduce phase and amplitude distortions to the signal, thereby reducing the signal to noise ratio. To produce delay lines with sufficiently precise lengths is a difficult and expensive process. In addition, the delays introduced by the delay lines will vary with the ambient temperature and humidity. While, in principle, these variations can be compensated for via calibration during power up and further periodic calibration during operations, the need for calibration circuitry will eliminate the advantages of using a single channel receiver. Furthermore, as the lengths of the delay lines are determined according to a particular sampling rate, any changes in the sampling rate will require a set of delay lines having different lengths, leading to a system that is inflexible and difficult to adapt to new circumstances.

Digital signal processing using fast Fourier transforms (FFT's) to compensate for the time delays between samples received from antennae in an array has also been proposed. The FFT processing attempts to finely channelise the signal to a sufficiently small bandwidth that the time delays can be approximated by phase shift. Reliable approximation can only be achieved when the largest time delay is very much smaller than the inverse of the bandwidth. However, very high antenna and analogue to digital conversion sampling rates and long integration times are required to achieve the desired channelised bandwidth. Nevertheless, as a result of this approximation, the reconstructed array output will suffer a reduced signal to noise ratio due to signal decorrelation. In addition, this approach will require N FFT processors to align the data output by the array, which will further increase the cost and complexity of the direction finder.

SUMMARY OF THE INVENTION

It is an object of the present invention to seek to provide a method of determining the angle of arrival of the signal, which method alleviates some or all of the above drawbacks.

Accordingly, the present invention provides a method of determining the angles of arrival of a plurality of signals, the method comprising the steps of: providing a plurality of antennae, sampling, in turn, the output from each of the antennae, to obtain a set of samples, each of the samples relating to different points in time; performing a Fourier transform on the set of samples, thereby producing a sequence of spectral lines; identifying each of a plurality of signals impinging on the antennae from the configuration of the spectral lines; and calculating, from phase and amplitude data gathered from at least respective subset of the spectral lines, the directions of arrival of each of the plurality of signals at the antennae.

Advantageously, the plurality of antennae are spatially separated from one another.

Alternatively, the plurality of antennae are provided at substantially the same location as one another.

Preferably, the plurality of antennae have differing gain characteristics from one another.

Conveniently, each of the subsets of the spectral lines relates to one of the plurality of signals.

Advantageously, the method further comprises the formulation of a vector comprising one of the subsets of the spectral lines.

Preferably, the step of identifying the plurality of signals impinging on the antennae from the configuration of the spectral lines comprises the step of identifying the signals impinging on the antennae from the positions of the spectral lines with respect to one another.

Conveniently, the method further comprises the step of determining the frequency of each of the plurality of signals.

Advantageously, the step of determining the frequency of each of the plurality of signals comprises the step of determining the frequency of each signal from the positions of the spectral lines relating to that signal.

Preferably, the outputs from the antennae are sampled by a single receiver.

Another aspect of the present invention provides a direction finder comprising: plurality of antennae; receiver, operable to collect samples from the antennae; switching network, operable to connect the antennae, in turn, to the receiver; and a processor operable to: receive a set of samples from the receiver, each of the samples relating to different points in time; perform a Fourier transform on the set of samples, thereby producing a sequence of spectral lines; identify a plurality of signals impinging on the antennae from the configuration of the spectral lines; and calculate, from phase and amplitude data gathered from at least a subset of the spectral lines, the direction of arrival of each of the plurality of signals at the antennae.

Conveniently, the plurality of antennae are spatially separated from one another.

Alternatively, the plurality of antennae are provided in substantially the same location as one another.

Advantageously, the plurality of antennae have differing gain characteristics from one another.

A further aspect of the present invention provides a direction finder comprising: a plurality of antennae; a receiver, operable to collect samples from the antennae; a switching network, operable to connect the antennae, in turn, to the receiver; and processing means operable to: receive a set of samples from the receiver, each of the samples relating to different points in time; perform a Fourier transform on the set of samples, thereby producing a sequence of spectral lines; identify a plurality of signals impinging on the antennae from the configuration of the spectral lines; and calculate, from phase and amplitude data gathered from at least a subset of the spectral lines, the direction of arrival of each of the plurality of signals at the antennae.

BRIEF DESCRIPTION OF THE DRAWINGS

In order that the present invention may be more readily understood, an embodiment thereof will now be described, by way of example, with reference to the accompanying drawings, in which.

DETAILED DESCRIPTION

Figure 1:
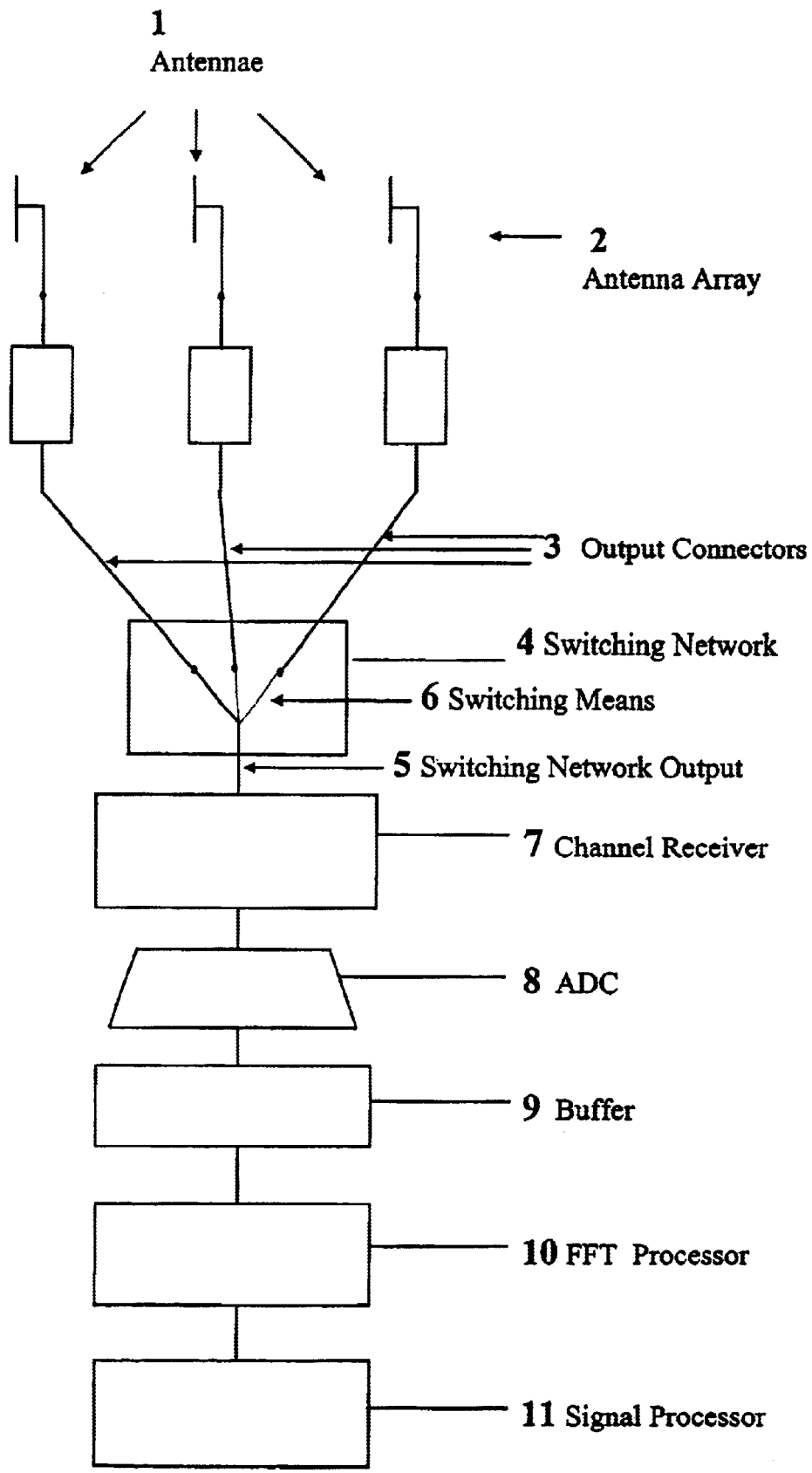
FIG. 1 shows a schematic layout of hardware used in the implementation of an embodiment of the present invention.

Referring to FIG. 1, a plurality of antennae 1 are provided, the antennae 1 being spatially separated from one another. Although only three antennae 1 are depicted, a skilled person will appreciate that the present invention is not limited to this number of antennae 1, and that any appropriate number of antennae 1 may be employed. The antennae 1 constitute an antenna array 2.

The antennae 1 in the antenna array 2 are connected by respective antenna output connectors 3 to a switching network 4. The antenna output connectors 3 provide inputs to the switching network 4 which has a single output 5. Within the switching network 4, switching means 6 are employed to connect one of the antenna output connectors 3 to the output 5 of the switching network 4, and to switch rapidly between antenna output connectors 3. The output 5 of the switching network 4 is connected to a single channel receiver 7. The signal subsequently passes to downstream processing means comprising an analogue to digital converter (ADC) 8, a buffer 9, a FFT processor 10 and a signal processor 11.

In use of the detector in the method embodying the present invention, the antennae 1 are connected in turn to the single channel receiver 7 by the switching network 4. The signals received from the antennae 1 may be band-pass filtered between the antennae 1 and the switching network 4.

The signal output from the switching network 4, $Z_c(t)$, is down-converted by the downstream processing means to an appropriate intermediate frequency to give a further signal $Z(t)$. This further signal is digitised by an analogue to digital converter to give a digital signal $Z(t+iT_s)$, where $T_s$ is the sampling interval (i.e. the time interval between the sampling of successive antennae 1). It is assumed that the signal is appropriately conditioned, for instance amplified and filtered, at this stage. It is also assumed that the analogue to digital conversion of the signal $Z(t)$ and the antenna sampling by the switching network 4 are synchronised.

Following digitisation of the signal by the ADC, the data samples are buffered in Q samples, Q being greater than the number of antennae 1 in the array 2. Each such batch of data undergoes a discrete Fourier transfer, and this can be efficiently achieved by using a FFT when Q is a power of 2. As a result of the periodicity in the sampling of the data from the antenna array 2, the digital spectrum $Z_{FT}(\omega)$ obtained by performing a Fourier transform on the digitised signal $Z(t+iT_s)$ is periodic on $\omega$, with period $$\omega_s = \frac{2\pi}{T_s}.$$

Figure 3A:
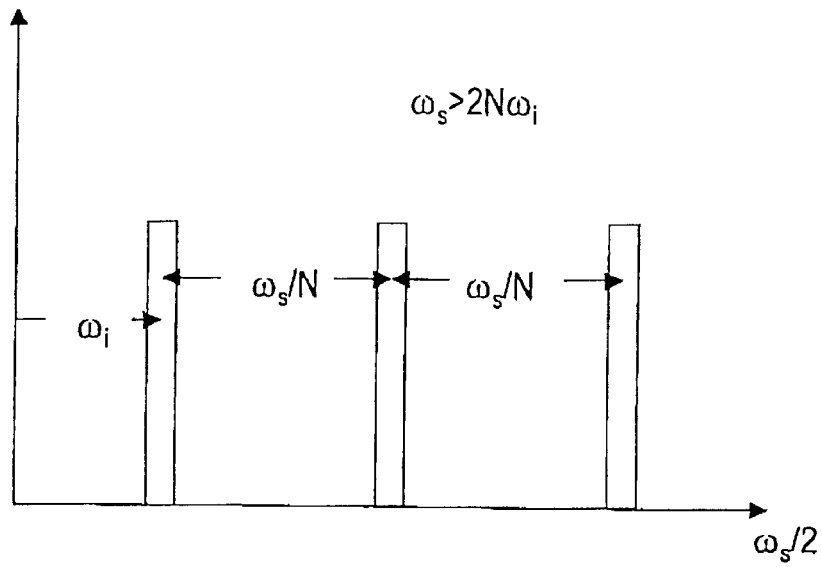
FIGS. 3a and 3b show representations of digital spectra produced using the antenna array of FIG. 2.
Figure 3B:
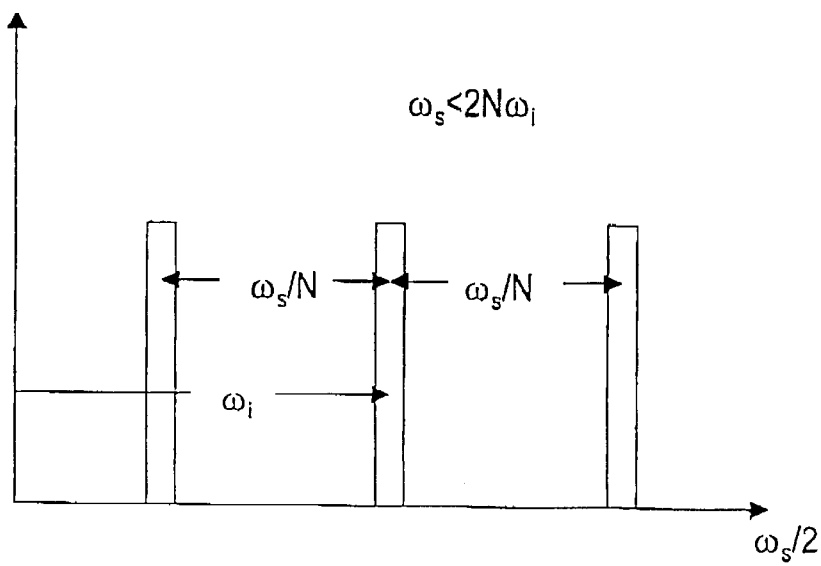

The average sampling frequency is $$\frac{\omega_s}{2\pi},$$

and it will be appreciated that one period of the digital spectrum $Z_{FT}(\omega)$ is made up of N spectral lines uniformly spaced over frequency, where N is the number of antennae 1 in the antenna array 2. The p th spectral line is located in frequency space at $$\mathrm{mod}\left(\omega_i \pm p\frac{\omega_s}{N}, \omega_s\right),$$

where the operator mod(a,b) computes the remainder of a/b and $\omega_s$ is the frequency of the signal impinging on the antenna array 2. FIGS. 3*a* and 3*b* depict the spacing of the spectral lines in the digital spectrum $Z_{FT}(\omega)$ when N=3 (i.e. three antennae 1 are present in the antenna array 2) and when $\omega_s > 2N\omega_i$ and $\omega_s < 2N\omega_i$ respectively.

The signal received from the output 5 of the switching network 4 can be seen as an amplification and sampling of the signals impinging of the antenna array 2 in a non-uniform but periodic manner, and the observed sample signal $Z(t+iT_s)$ can be considered to be equivalent to sampling an impinging signal with the sampling sequence $$\{\tau_{\alpha(1)}(\theta)+T_s, \ldots, \tau_{\alpha(N)}(\theta)+NT_s, \tau_{\alpha(1)}(\theta)+(N+1)T_s, \ldots, \tau_{\alpha(N)}(\theta)+2NT_s, \ldots\},$$
$$\{\beta_{\alpha(1)}(\theta), \ldots, \beta_{\alpha(N)}(\theta), \beta_{\alpha(1)}(\theta), \ldots, \beta_{\alpha(N)}(\theta)\}$$

where $\tau_{\alpha(1)}(\theta)$ and $\beta_{\alpha(i)}(\omega)$ are, respectively, the time delay associated with a given antenna 1 in the antenna array 2, with respect to a fixed reference point, due to propagation of impinging signals, and the antenna gain associated with a given antenna 1 in the antenna array 2. $\alpha(i) \in \{1, \ldots, N\}$, and is the index of the antenna.

A skilled person will appreciate that the sampling rate is determined by the bandwidth of interest. In principle, the sampling rate only needs to exceed 2N times the signal bandwidth.

Figure 2:
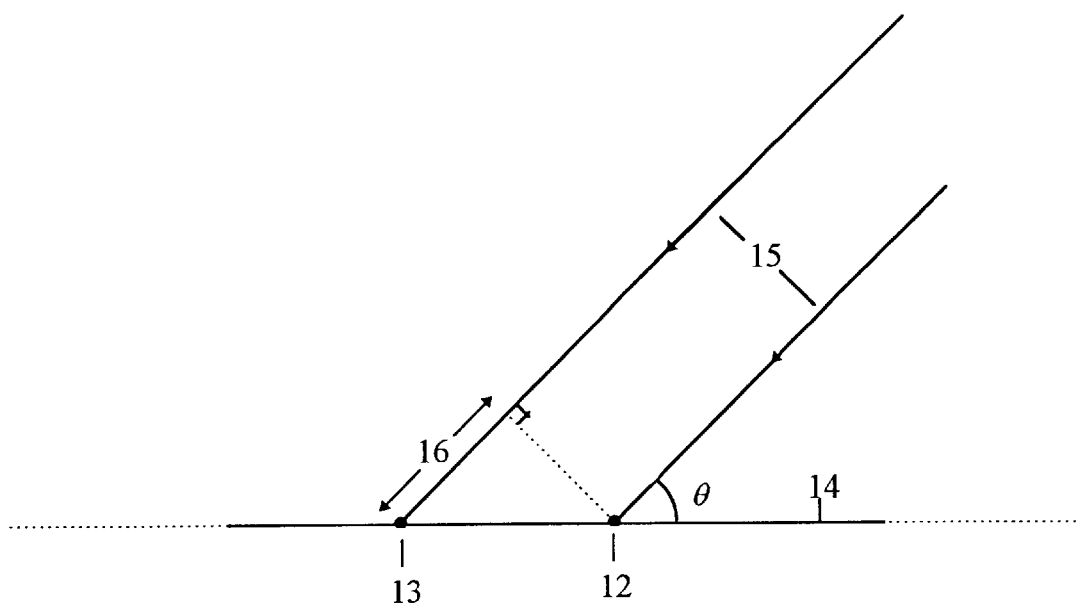
FIG. 2 shows two antennae in an antenna array for use with the embodiment of FIG. 1.

It will also be appreciated that the above-mentioned time delay varies with the angle of arrival of a signal impinging on the antenna array 2, and this is elaborated further in FIG. 2. Turning to FIG. 2, two antennae 12, 13 are aligned with one another in a first direction 14. An impinging signal 15 arrives at the two antennae 12, 13 at an angle θ to the first direction 14. Unless the angle θ is 90°, corresponding wave fronts of the impinging signal 15 will strike one of the antennae 12 before reaching the other antenna 13. The time delay before a corresponding wave front of the signal 15 strikes the second antenna 13 is given by the additional distance that the wave front must travel (indicated by reference numeral 16 in FIG. 2) divided by the speed of propagation of the signal.

Figure 4:
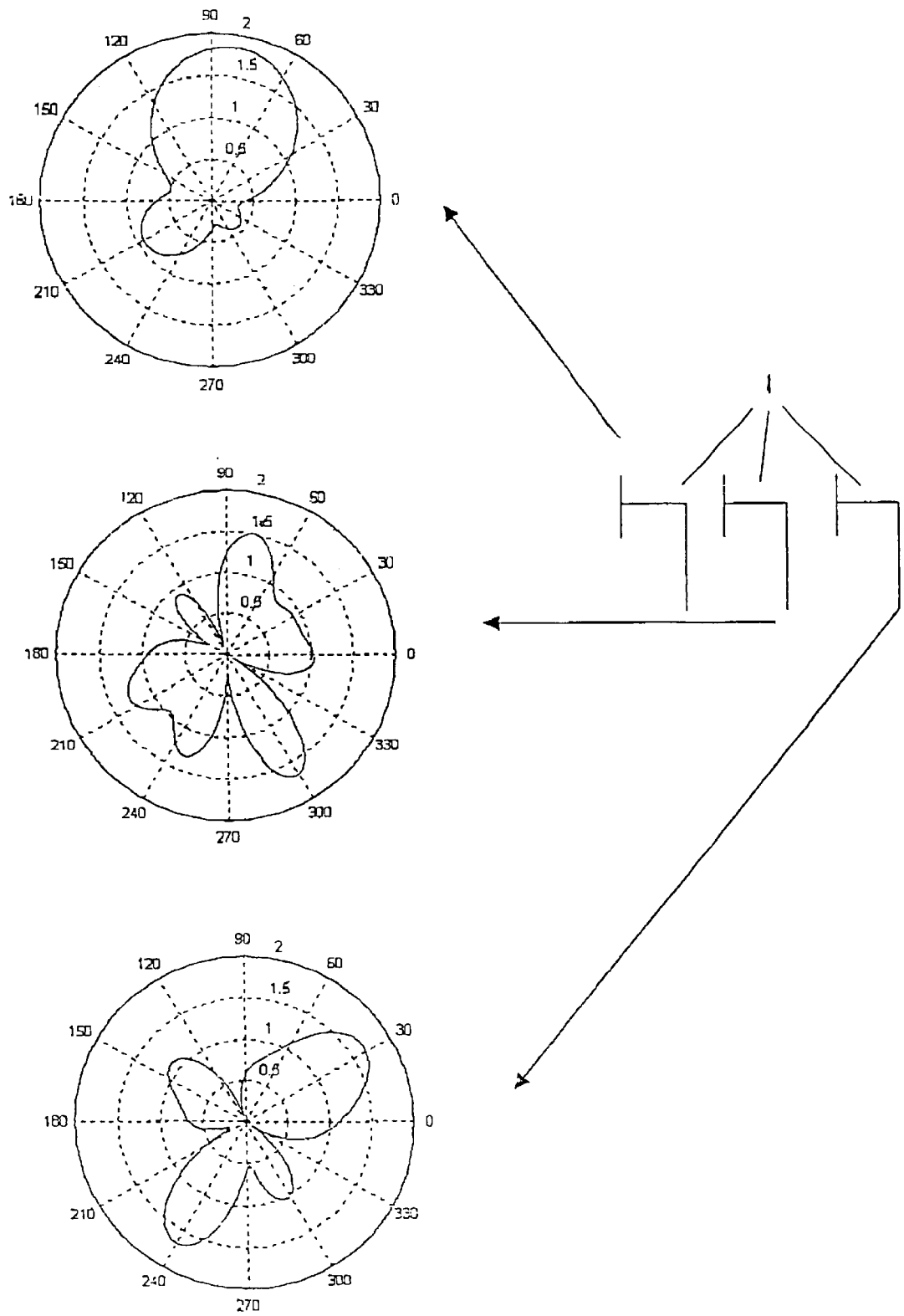
FIG. 4 shows antenna gain patterns of three antennae for use in a further embodiment of the present invention.

Turning to FIG. 4, three possible antenna gain patterns are shown. It is possible to employ antennae having differing gain patterns to provide an alternative to an array of spatially separated antennae, as described above. A skilled person will appreciate that, if the gain characteristics of two antennae are sufficiently different, signals impinging on the antennae from different directions of arrival will give rise to different sequences of amplitude samples.

Hence, it will be appreciated that a set of antennae having different gain patterns may replace the above described array of spatially separated antennae. The set of antennae need not be spatially separated from one another, and indeed may be provided at substantially the same location as each other. It will be appreciated that this configuration is likely to result in a more compact direction finder.

Returning to the sampling sequence given above, it will be appreciated that each different angle of arrival of a signal impinging on the antenna array 2 will give rise to a different sampling sequence. It is this relationship that is exploited when determining the angle of arrival of signals impinging on the antenna array 2.

When $\omega_s > 2N\omega_{max}$, where $\omega_{max}$ is the largest intermediate frequency, the frequencies of signals impinging on the antenna array 2 can be determined directly from the location of the N uniformly spaced spectral lines in the digital spectrum $Z_{FT}(\omega)$ of the sampled signal. The frequency of each signal is the lowest frequency of the detected N uniformly spaced spectral lines.

Once the frequencies of the impinging signals have been established, the direction of arrival of each of the signals is determined from the phase and amplitude information in the sampled data, which information is a function of the directions of arrival of the signals.

Direction finding is achieved by first collecting the amplitudes and phases from the N spectral lines corresponding to an impinging signal into a vector $\vec{Z}_{FT}(\omega_i)$. The following low-rank data model is obtained:

$$\vec{Z}_{FT}(\omega_i) = \vec{A}(\Theta, \omega_i) X_{FT}(\omega_i) + \vec{W}(\omega_i)$$

Where $$\Theta = [\theta_1 \ldots \theta_d]^T,$$

where d is the number of impinging signals detected at $\omega_i$.
$\vec{A}(\Theta, \omega_i) = [\vec{a}(\theta_{1,\omega i}) \ldots \vec{a}(\theta_{d,\omega i})]$, and
$X_{FT}(\omega_i) = [x_{FT,1}(\omega_i) \ x_{FT,2}(\omega_i) \ x_{FT,3}(\omega_i)]$
and where $x_{FT,1}(\omega_i)$ is the direct Fourier transform (DFT) of the lth signal source $x_l(t)$ at $\omega_i$. $\vec{a}(\theta, \omega_i)$ is the direction embedding vector function and can be interpreted as the "transfer function" for the signal incident to the spinning array from direction θ. It is given by $$\vec{a}(\theta, \omega_i) = [\tilde{A}(\omega_i, 0), \ldots, \tilde{A}(\omega_i, N-1)]^t$$

where $$\tilde{A}(\omega_i, l) = \frac{1}{N} \sum_{p=0}^{N-1} \beta_p(\theta) \exp(-j\omega_i \tau_p(\theta)) \exp\left(j\frac{2\pi l p}{N}\right)$$

which is a function of the spatial geometry of the antennae 1 in the antenna array 2. Using the low-rank data model set forth above, the direction of arrival of plural impinging signals can be performed using direction finding algorithms developed to process signals obtained from a conventional multi-antenna, multi-receiver detector. These algorithms include computationally efficient algorithms such as MUSIC and Capon's beamformer, and statistically optimal, but computationally demanding algorithms such as stochastic maximum likelihood, noise sub-space fitting etc. algorithms. Versions of these algorithms, adapted to be applied to the data received from the switching network 4, may be employed, and a skilled person will appreciate how such adaptation is to be achieved.

For instance, the MUSIC cost function can be expressed as $$f_{music}(\theta) = |a^H(\theta, \omega_i) \Pi_N a(\theta, \omega_i)|$$

Where $\Pi_N$ is the noise sub-space that is derived from the array covariance matrix, $$E[Z_{FT}(\omega_i) Z_{FT}^H(\omega_i)]$$

and where $E[\cdot]$ is the expectation operator.

When $\omega_s < 2N\omega_{max}$, the data model given above still remains valid, but the direction of arrival and frequency of impinging signals need to be jointly estimated. The position of the spectral lines is given by $$\text{mod}\left(\omega_i \pm p\frac{\omega_s}{N}, \omega_s\right).$$

The frequency of the signal may not be the lowest frequency of the N uniformly spaced spectral lines when $\omega_s < 2N\omega_i$. Hence, the frequencies of the signal must be determined by a different route. It will be noted that the signal frequency is one of the components in the N uniformly spaced spectral lines. Therefore, after the N uniformly spaced spectral lines have been detected and determined, the direction of arrival and frequency can be jointly estimated as follows:

$$f_{MUSIC}(\theta, \omega) = |a^H(\theta, \omega) \Pi_N a(\theta, \omega)|$$

where the search for the signal frequency $\omega$ is constrained to the finite set of N uniformly spaced spectral lines detected previously. The application of this approach to joint direction of arrival and frequency estimation using other conventional high resolution direction finding algorithms (for instance those discussed above) will be straightforward to a skilled person.

In the presence of M signal sources of different frequency, the extracted spectral lines will have to be de-interleaved M groups of N uniformly spaced spectral lines. Depending on whether operating under $\omega_s \geq 2N\omega_{max}$ or $\omega_s < 2N\omega_{max}$ estimation of direction of arrival and frequency will be performed in accordance with the approaches described above.

It will be understood that the present invention provides a powerful method for estimating the directions of arrival of signals impinging on a spinning antenna array, that is both accurate and less computationally intensive than existing algorithms for performing this purpose. In particular, the fact that the method of the present invention does not attempt to temporally align the signals received from the antennae 1 in the antenna array 2 with one another leads to significant benefits with regard to the requirements that are placed on the processing circuitry employed for use with embodiments of the invention.

In the present specification "comprises" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A method of determining the angles of arrival of a plurality of signals, the method comprising the steps of:
   providing a plurality of antennae;
   sampling, in turn, the output from each of the antennae, to obtain a set of samples, each of the samples relating to different points in time;
   performing a Fourier transform on the set of samples, thereby producing a sequence of spectral lines;
   identifying each of a plurality of signals impinging on the antennae from the configuration of the spectral lines; and
   calculating, from phase and amplitude data gathered from at least respective subsets of the spectral lines, the directions of arrival of each of the plurality of signals at the antennae.

2. A method according to claim 1, wherein the plurality of antennae are spatially separated from one another.

3. A method according to claim 1, wherein the plurality of antennae are provided at substantially the same location as one another.

4. A method according to claim 1, wherein the plurality of antennae have differing gain characteristics from one another.

5. A method according to claim 1, wherein each of the subsets of the spectral lines relates to one of the plurality of signals.

6. A method according to claim 1, further comprising the formulation of a vector comprising one of the subsets of the spectral lines.

7. A method according to claim 1, wherein the step of identifying the plurality of signals impinging on the antennae from the configuration of the spectral lines comprises the step of identifying the signals impinging on the antennae from the positions of the spectral lines with respect to one another.

8. A method according to claim 1, further comprising the step of determining the frequency of each of the plurality of signals.

9. A method according to claim 8, wherein the step of determining the frequency of each of the plurality of signals comprises the step of determining the frequency of each signal from the positions of the spectral lines relating to that signal.

10. A method according to claim 1, wherein the outputs from the antennae are sampled by a single receiver.

11. A direction finder comprising:
    a plurality of antennae;
    a receiver, operable to collect samples from the antennae;
    a switching network, operable to connect the antennae, in turn, to the receiver; and
    a processor operable to:
       receive a set of samples from the receiver, each of the samples relating to different points in time;
       perform a Fourier transform on the set of samples, thereby producing a sequence of spectral lines;
       identify a plurality of signals impinging on the antennae from the configuration of the spectral lines; and
       calculate, from phase and amplitude data gathered from at least a subset of the spectral lines, the direction of arrival of each of the plurality of signals at the antennae.

12. A direction finder according to claim 11, wherein the plurality of antennae are spatially separated from one another.

13. A direction finder according to claim 11, wherein the plurality of antennae are provided in substantially the same location as one another.

14. A direction finder according to claim 11, wherein the plurality of antennae have differing gain characteristics from one another.

15. A direction finder comprising:
   a plurality of antennae;
   a receiver, operable to collect samples from the antennae;
   a switching network, operable to connect the antennae, in turn, to the receiver; and
   processing means operable to:
      receive a set of samples from the receiver, each of the samples relating to different points in time;
      perform a Fourier transform on the set of samples, thereby producing a sequence of spectral lines;
      identify a plurality of signals impinging on the antennae from the configuration of the spectral lines; and
      calculate, from phase and amplitude data gathered from at least a subset of the spectral lines, the direction of arrival of each of the plurality of signals at the antennae.

* * * * *